United States Patent [19]

Fontaine et al.

[11] Patent Number: 4,504,695

[45] Date of Patent: Mar. 12, 1985

[54] POWER CABLE JOINT

[75] Inventors: Gregory N. Fontaine, Rye; Richard T. Traut, Dover, both of N.H.

[73] Assignee: Simplex Wire & Cable Company, Portsmouth, N.H.

[21] Appl. No.: 517,350

[22] Filed: Jul. 26, 1983

[51] Int. Cl.³ .............................................. H02G 15/08
[52] U.S. Cl. ................................ 174/21 R; 174/88 R; 174/89
[58] Field of Search ................... 174/21 R, 70 S, 88 R, 174/89

[56] References Cited

U.S. PATENT DOCUMENTS

| | | | |
|---|---|---|---|
| 1,241,809 | 10/1917 | Beardsley et al. | 174/88 R |
| 1,647,699 | 11/1927 | Hoeftmann | 174/21 R |
| 1,680,231 | 8/1928 | Simons | 174/21 R |
| 2,142,884 | 1/1939 | Chaplin | 174/21 R |
| 2,449,983 | 9/1948 | Devol | 174/21 R |
| 2,635,975 | 4/1953 | Peters | 174/70 S |
| 3,564,117 | 2/1971 | Scheffler et al. | 174/89 |
| 3,828,114 | 8/1974 | Priaroggia et al. | 174/21 R X |
| 4,259,543 | 3/1981 | Oldham | 174/70 S |

FOREIGN PATENT DOCUMENTS

| | | | |
|---|---|---|---|
| 2331672 | 1/1974 | Fed. Rep. of Germany | 174/88 R |
| 519864 | 4/1940 | United Kingdom | 174/21 R |
| 888381 | 1/1962 | United Kingdom | 174/89 |

Primary Examiner—A. T. Grimley
Assistant Examiner—Morris H. Nimmo
Attorney, Agent, or Firm—Austin R. Miller

[57] ABSTRACT

A coupling for joining two sections of an electric power cable, each power cable section having an inner conductor, an insulating sheath about the inner conductor, an armored winding layer comprised of a plurality of wrapped armor rods and an insulating layer about the armored winding layer, is provided. The coupling includes an inner conductor splice housing, two armored winding termination housings lockably attached to the ends of the splice housing, means for mechanically anchoring the armor rods from a cable section within an armored winding termination housing, means for electrically connecting the armor rods to the anchoring means so that the armor rods are electrically insulated from the armored winding termination housing as well as the inner conductor, and means for electrically securing the anchoring means in one termination housing to the anchoring means in the other termination housing.

13 Claims, 1 Drawing Figure

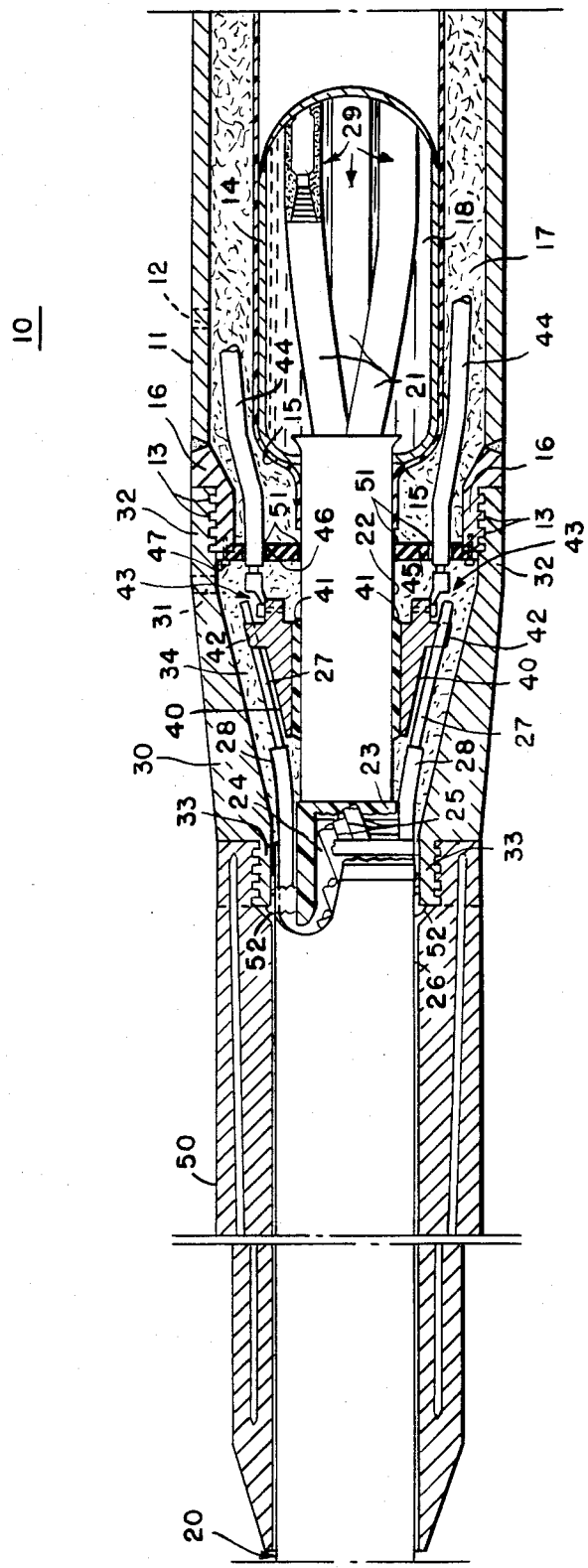

POWER CABLE JOINT

BACKGROUND OF THE INVENTION

1. Field of the Invention

The invention relates to the field of joints or couplings for electric power cables and more specifically to the field of submarine electric power cable couplings or terminations.

2. Description of the Prior Art

U.S. Pat. No. 2,142,884 discloses an electric power cable joint having conductors enclosed within an inner lead sheath which is further enclosed within a second lead insulating sheath. The insulating sheaths are wrapped with a layer of armored winding wires, the ends of which are secured to armored clamps.

U.S. Pat. No. 1,647,699 discloses an electric cable joint having a cable splice housing threadably attached to an armor termination housing.

U.S. Pat. No. 2,449,983 discloses an electric power line coupling having an inner conductor surrounded by an insulating layer which is further surrounded by an outer conductor comprising a copper braid. The ends of the copper braid contact an incline surface of a metallic member which in turn contacts a second metallic member. In this way, electrical contact is established between the wire braids 13 through the coupling.

U.S. Pat. No. 4,259,543 discloses a submarine electric power cable termination having a cone for mechanically anchoring the armored winding wires and having an outer serving for insulating both the armored winding wires and an inner insulating sheath from the sea environment.

The manufacturing and installation of multi-conductor high voltage power cable requires the use of factory jointing techniques. Such cables can only be produced in continuous (i.e., jointless) lengths up to the volume and weight limits of the cabling machine bobbins. For multi-conductor cables that must be cabled (twisted together) the length limits are typically in the 1 to 2 kilometer range. Submarine power cables are often longer than 2 kilometers.

Factory joints installed in submarine power cables are typically subjected to high tension and bending stresses during handling, installation and use. Due to these unusual stresses, submarine power cable joints are designed differently than land-based power cable joints. Land-based cables are always installed first and then jointed so that such joints are never subjected to the bending and the high forces that occur in submarine power cable splices. Also, land-based cables seldom have the protective armored winding layers present in submarine cables to provide protection against torsional loads placed on the cable.

During typical submarine cable system operation, both continuous and transient electrical potentials occur between the lead sheath of the cable and the armor, and between the lead sheath and the sea which could result in destruction of the lead sheath. Since the electrical integrity of the underlying PILC or SCOF electrical insulation depends upon the hermetic seal provided by the lead sheath, destruction (puncturing or cracking) of the lead sheath leads to electrical failure of the power cable.

SUMMARY OF THE INVENTION

Thus, it is an object of the present invention to provide a technique for positively controlling the distribution of mechanical stresses in the joint and adjacent cable while transferring the armor strength across the joint housing.

It is another object of the present invention to prevent the occurrence of localized or "spot" corrosion of the armor and housing due to the presence of induced electrical currents in the armor.

It is another object of the present invention to prevent the occurrence of electrical currents, by providing electrical insulation between sheath and armor, and between sheath and sea (which is close to ground potential electrically).

It is an important object of the present invention to provide a coupling for an electric power cable having an inner conductor, an insulating sheath about the inner conductor, an armored winding layer comprised of a plurality of wrapped armor rods and an insulating service layer about the armored winding layer, the coupling having means for transferring the strength of the armored winding layer across the coupling.

It is another important object of the present invention to provide a coupling for such an electric power cable including means for electrically insulating the sheath from the armored winding layer.

It is another important object of the present invention to provide such a coupling having means for electrically insulating the sheath from the exterior environment, typically sea water, of the cable.

It is a further important object to provide such a coupling having means for electrically insulating the armored winding layer from the exterior environment, typically sea water, of the cable.

It is still a further important object of the present invention to provide such a coupling having means for providing electrical continuity of the armored winding layer conductor rods across the coupling.

These and other objects are met by the power cable coupling joining two sections of an electric power cable, the power cable having an inner conductor, an insulating sheath about the inner conductor, an armored winding layer comprised of a plurality of wrapped armor rods and an insulating layer about the armored winding layer. The power cable coupling comprises the combination of an inner conductor splice housing, two armored winding termination housing lockably attached to the ends of the splice housing, means for mechanically anchoring the armor wires from a cable section within an armored winding termination housing, means for electrically connecting the conductor rods to the anchoring means, such that they are insulated from the armored winding termination housings and the inner conductor, and means for electrically securing the anchoring means in one termination housing to the anchoring means in the other termination housing, the electrically securing means being electrically insulated from the splice housing.

BRIEF DESCRIPTION OF THE DRAWING

The invention, its organization, construction and operation will be best understood from the following detailed description taken in conjunction with the accompanying drawing in which:

The FIGURE is a sectional view of a preferred embodiment of the electric power cable conduit of the present invention.

Although specific forms of the invention have been selected for illustration in the drawing, and although specific terms will be used in this specification in describing the features illustrated therein, these are not intended to define or to limit the scope of the invention which is defined in the appended claims.

DESCRIPTION OF THE PREFERRED EMBODIMENTS

The following description of one preferred embodiment of the invention discloses a mechanical/electrical power cable joint suitable for impregnated paper lead covered (PILC) three-conductor cables rated 37 kilovolts phase-to-phase at 60 Hertz. The described embodiment is also suitable for all PILC and self-contained oil-filled (SCOF) single phase and three phase cables for use on systems at varied transmission and distribution voltages.

Referring to the drawing, the power cable coupling is generally referred to as 10. The coupling consists of a galvanized steel splice housing 11 having a substantially cylindrical shape. Splice housing 11 has two end portions 16 (only one shown in the drawing) having screw threads 13. Thus, in the manner shown in the drawing, a galvanized steel armor termination housing 30 is adapted to be threadably attached to each end of the splice housing 11.

The electric power cable illustrated in the drawing is especially adapted for submarine transmission. The cable 20 is a multi-conductor cable having in this specific embodiment three inner conductors 21. Immediately surrounding the inner conductors 21 is a lead sheath 22. Surrounding lead sheath 22 is a neoprene jacket 23. Surrounding neoprene jacket 23 is a jute bedding layer 24. Surrounding jute bedding layer 24 is an armored winding layer 25. As can be seen, the armored winding layer comprises a plurality of helically wrapped armor rods 27 each encased in an insulation jacket 28. Immediately surrounding the armored winding layer 25 is an outer serving layer 26 typically composed of JEA 50 HYTEN with a tar covering.

Within splice housing 11 is positioned lead sleeve 14 containing the splices 29 for the inner conductors 21. Lead sleeve 14 connects in fluid sealing relation with the ends of the lead sheath 22 in each cable section. The space 18 within lead sleeve 14 is typically filled with an oil. Lead sleeve 14 as well as lead sheath 22 adjacent the joint with lead sleeve 14 is wrapped with a layer of neoprene tape 15.

Positioned within armor termination housing 30 is an armor bonding and wedge cone 40. Cone 40 is mounted on a layer of neoprene tape 41 wrapped around lead sheath 22. In this way, the cone 40 as well as the armor rods 27 are electrically insulated from the lead sheath 22. Cone 40 has a plurality of slots 42 into which armor rods 27 are adapted to be positioned. As can be seen, the insulation 28 has been cut back from the end of armor rods 27 at their connection to the cone 40 to facilitate a good electrical connection therebetween. Typically, the armor rods 27 are welded to cone 40. Cone 40 also has a plurality of electrical contacts 43. A plurality of jacketed conducting wires 44 are adapted to connect to the electrical contacts 43. Conducting wires 44 run through the splice housing 11 to the opposite armor termination housing 30 (not shown) to conduct with a similar armor bonding and wedge cone 40 welded to the armor rods 27 of another cable section (not shown). In this way, electrical continuity along the armored winding layer 25 is maintained across the coupling.

An annular centering plate 45 composed of a nonconducting material is positioned over the lead sheath 22 at each end of the splice housing 11. Plate 45 has a plurality of holes 46 for the passage of the conducting wires 44. Plate 45 maintains the proper spacing of the conductor wires 44 and provides electrical insulation between the sheath 22 and the housings 11, 30. Plate 45 is secured to the ends 16 of the splice housing 11 with a plurality of pins 47.

Armor termination housing 30 is threaded at its ends 32, 33 so that it threadably engages both the splice housing 11 and the bending restricting member 50. Bending restricting member 50 typically contains reinforcing material such as steel strips and has a hard rubber or plastic outer covering. Member 50 runs along a length of the cable sections immediately adjacent the coupling 10 to reinforce, and limit the degree of bending of, the cable in the vicinity of the coupling 10. Member 50 is typically used in situations where the cable 20 travels over a sheave or pulley during cable manufacture or transport.

A damming material 51 (typically twine or jute) is forced in the openings of holes 46 in plate 45. In a like manner damming material 51 is stuffed into the space around lead sheath 22. In this manner, the interior space 17 of splice housing 11 is maintained separate from the interior space 34 of armor termination housing 30.

Likewise, a water dam 52 (typically an epoxy resin or silicone caulking) is maintained between threaded end 33 of armor termination housing 30 and outer serving 26 of the cable 20.

Once the coupling 10 has been assembled, a hardenable fluid material, such as an epoxy resin, is injected through fill port 31 to occupy the available space 34 within the armor termination housing 30. Likewise, a tar based fill compound is injected through port 12 into the interior space 17 of splice housing 11. Small bleed ports (not shown) may be provided in both the splice housing 11 and armor termination housings 30 to facilitate filling with these materials.

In the finished coupling 10, the armor rods 27 become encapsulated within the epoxy resin providing excellent means of transferring the mechanical strength of the armored winding layer 25 through the coupling 10 to the armored winding layer 25 on the other side. This transferral is essential to the proper mechanical performance of the coupling 10 and adjacent cable sections 20 during the handling, installation and use of the submarine power cable. The coupling 10 ensures that the electrical connection within the splice housing 11, and especially the lead sleeve 14 and the junction of the lead sleeve 14 and the lead sheath 22, be restrained from experiencing the motions and forces naturally encountered in submarine use. Since the lead sheath 22-lead sleeve 14 junction is poorer mechanically than the cable lead sheath 22 and is subject to damage if subjected to twisting and/or tension and/or compression, the invention provides a positive means of restraining this junction from movement and avoids a potentially disastrous effect. At the same time the epoxy provides electrical isolation, as previously described, by sealing the components from water ingress and providing sufficient epoxy insulation thickness between metallic components.

Furthermore, the neoprene jacket 15 as well as the tar base fill compound injected into the space 17 provides insulation between the lead sleeve 14 and the conductor wires 44 as well as insulation from the external environment of the coupling 10. The outer serving 26, the epoxy material injected into space 34 as well as the tar based fill compound injected into space 17 provide electrical insulation of the armored winding layer 25 from the external environment of the coupling 10.

Although this invention has been described in connection with specific forms thereof, it will be appreciated that a wide variety of equivalents may be substituted for those specific elements shown and described herein, that certain features may be used independently of other features, and that certain parts may be reversed all without departing from the spirit and scope of this invention as described in the appended claims.

We claim:

1. In a coupling for two sections of an electric power cable, each section of the power cable having an inner conductor, an insulating sheath about the inner conductor, an armored winding layer comprised of a plurality of wrapped armor rods and an insulating layer about the armored winding layer, the coupling comprising the combination of:
   a. a rigid splice housing partially filled with a hardened electrically insulating material for transferring the strength and stability of the sheath and armored winding layer across the coupling;
   b. means for maintaining the sheath electrically insulated from the armored winding layer across the coupling;
   c. means for maintaining the sheath electrically insulated from an exterior environment of the cable across the coupling;
   d. means for maintaining the armored winding layer electrically insulated from the exterior environment of the cable across the coupling; and
   e. means for providing electrical continuity of the armored rods across the coupling.

2. In a coupling between two sections of an electric power cable, each section of the power cable having an inner conductor, an insulating sheath about the inner conductor, an armored winding layer comprised of a plurality of wrapped armor rods and an insulating layer about the armored winding layer, the coupling comprising the combination of;
   a. a rigid splice housing partially filled with a hardened electrically insulating material;
   b. two armored winding termination housings lockably attached to the ends of the splice housing;
   c. means for mechanically anchoring the armor rods from each cable section within an armored winding termination housing;
   d. means for electrically connecting the armor rods to the anchoring means (c), the means (c) being electrically insulated from the armored winding termination housing and the inner conductor; and
   e. means for electrically connecting the means (c) in one termination housing to the means (c) in the other termination housing, the means (e) being electrically insulated from the splice housing (a).

3. The coupling described in claim 1 or 2, wherein the power cable has a plurality of inner conductors.

4. The coupling as described in claim 1 or 2, wherein the rigid splice housing contains an oil filled lead sleeve engageable in fluid sealing relation with the ends of the insulated sheaths of the power cable sections.

5. The coupling as described in claim 2, wherein the means (c) is an armor bonding and wedge cone mounted on an insulation layer surrounding the insulated sheath to which the ends of the conductor rods are welded.

6. The coupling as described in claim 2, wherein the means (e) comprises a plurality of insulatingly jacketed conductor wires connected to the means (d) in each armor termination housing and running through the splice housing (a).

7. The coupling as described in claim 1 or 2, including a bending restricting member lockably engaged with the armor termination housing for reinforcing the power cable adjacent the coupling.

8. The coupling as described in claim 2, wherein the splice housing and the termination housings are composed of galvanized steel.

9. The coupling as described in claim 2, including a centering plate at each end of the splice surrounding the insulating sheath of the power cable section and having a plurality of holes therein for the passage of means (e) therethrough.

10. The coupling as described in claim 9, wherein each centering plate acts as a dam between the splice housing and the armor termination housing.

11. The coupling as described in claim 1 or 2, wherein the electrically insulating material is a tar based fill compound.

12. The coupling as described in claim 1 or 2, wherein the hardened electrically insulating material is an epoxy resin.

13. In a coupling between two sections of a submarine power cable, each power cable section having a plurality of inner conductors, an insulated lead sheath about the inner conductors, a neoprene layer about the lead sheath, a jute bedding layer about the neoprene layer, an armored winding layer comprising a plurality of insulatingly jacketed conductor rods helically wrapped about the jute bedding layer, and an outer water-proof insulated covering layer about the armored winding layer, the combination comprising:
   a. a rigid splice housing having two threadably engageable ends and a port for the injection of an electrically insulating fill material for transferring the strength and stability of the sheath and the armored winding layer across the coupling;
   b. an oil filled lead sleeve within the splice housing, the lead sleeve connecting in fluid sealing relation to the ends of the lead sheaths of the submarine power cable sections;
   c. two armored winding termination housings each threadably engaged with an end of the splice housing and each having a port for the injection of a non-conducting hardenable material;
   d. an armor bonding and wedge cone mounted on, but electrically insulated from, the lead sheath within each armored winding termination housing for mechanically anchoring and electrically connecting to the conductor rods;
   e. a plurality of the insulatingly jacketed conductor wires electrically connecting the two armor bonding and wedge cones;
   f. two conductor wire centering plates, each centering plate in fluid sealing relation with one end of the splice housing and having a plurality of holes therein for the passage of the conductor wires therethrough, the centering plates also being in fluid sealing relation with the conductor wires passing therethrough; and
   g. two bending restricting members, each engaged with an end of the armor termination housing and reinforcing the power cable sections adjacent the coupling.

* * * * *